United States Patent
Su et al.

(10) Patent No.: US 9,036,521 B2
(45) Date of Patent: May 19, 2015

(54) REDUCING BATTERY POWER CONSUMPTION DURING DISCONTINUOUS RECEPTION AND TRANSMISSION

(75) Inventors: Jin-Sheng Su, San Diego, CA (US); Vivek Ramaprasad, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 833 days.

(21) Appl. No.: 13/077,928

(22) Filed: Mar. 31, 2011

(65) Prior Publication Data

US 2012/0250538 A1  Oct. 4, 2012

(51) Int. Cl.
H04W 52/02  (2009.01)

(52) U.S. Cl.
CPC ........ *H04W 52/0229* (2013.01); *H04W 52/028* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,856,611 B2 * | 2/2005 | Chaudhuri et al. | 370/335 |
| 7,546,132 B2 * | 6/2009 | Lee et al. | 455/503 |
| 2003/0007470 A1 * | 1/2003 | Grilli et al. | 370/335 |
| 2008/0004023 A1 | 1/2008 | Chen et al. | |
| 2010/0203892 A1 * | 8/2010 | Nagaraja et al. | 455/437 |
| 2010/0208604 A1 * | 8/2010 | Kazmi et al. | 370/252 |
| 2010/0323683 A1 | 12/2010 | Kazmi et al. | |
| 2010/0330992 A1 | 12/2010 | Bhattacharjee et al. | |
| 2012/0113825 A1 * | 5/2012 | Baglin et al. | 370/252 |

FOREIGN PATENT DOCUMENTS

EP  2 034 633 A1  3/2009

OTHER PUBLICATIONS

Nokia: "Radio Interface ciphering". 3GPP S3-99062, 3rd Generation Partnership Project (3GPP), Mobile Competence Centre: France, presented in Stockholm, between Mar. 8 and Mar. 11, 1999 and Mar. 23 and Mar. 26, 1999.
RAN WG1: "LS on Neighbour Cell SFN Detection for Handover", 3GPP Draft; R4-000520_LS_Handover, 3rd Generation Partnership Project (3GPP), Mobile Competence Centre; France, vol. RAN WG4, presented in Turku, Finland, between May 22 and May 26, 2000.

(Continued)

*Primary Examiner* — Hassan Kizou
*Assistant Examiner* — Roberta A Shand
(74) *Attorney, Agent, or Firm* — Sterne, Kessler, Goldstein & Fox P.L.L.C.

(57) ABSTRACT

Techniques, systems and apparatus are described for reducing battery power consumption during a discontinuous reception and transmission mode of operation of a communication device. When operating in the discontinuous reception and transmission mode, a communication device can process radio frequency signals received from base stations to identify a set of active base stations based on a quality of the received radio frequency signals. This can reduce the total number of base stations to decode the corresponding system frame number (SFN). Based on the decoded SFN, the communication device can select a base station to perform handoff.

20 Claims, 14 Drawing Sheets

(56) References Cited

OTHER PUBLICATIONS

"3rd Generation Partnership Project; Technical Specification Group Radio Access Network; Radio Resource Control (RRC); Protocol Specification (Release 6)", 3GPP Standard; 3GPP TS 25.331 3rd Generation Partnership Project (3GPP), Mobile Competence Centre; France, No. V6.20.0; Dec. 1, 2008.

European Search Report for European Application EP 12 00 2104, European Patent Office, Rijswijk, netherlands, mailed on Jun. 21, 2012.

* cited by examiner

US 9,036,521 B2

REDUCING BATTERY POWER CONSUMPTION DURING DISCONTINUOUS RECEPTION AND TRANSMISSION

BACKGROUND

This application relates to devices, techniques and systems for communications, including wireless communication systems.

A wireless communication system can include a network of base stations (or radio cells) to wirelessly communicate with one or more wireless devices or user equipment (UE) devices via radio frequency (RF) signals. Examples of UE devices include a mobile device or mobile station (MS), a wireless air card or USB device, access terminal (AT), a subscriber station (SS), a portable computer (e.g., a laptop, a netbook computer or a tablet device), and an electronic reader. Each base station can emit radio signals that carry signaling and data to UE devices via forward links (FLs) or downlinks (DLs) within a limited geographic coverage area known as a radio cell (or cell). Also, a radio cell is synonymously described as a base station throughout this document.

The signaling can include various control and network management signals. The data can include any or all of voice data, text data, graphic data, application data, audio data, and video data. A base station can be referred to as an access point (AP) or an access network (AN), or can be included as part of an AN. A UE device can transmit a signal on a reverse link (RL), or uplink (UL), to a base station. The wireless communication system can include one or more radio access network controllers to control one or more base stations. Examples of various wireless technologies include Long-Term Evolution (LTE), Evolved High-Speed Packet Access (HSPA+), Code division Multiple Access (CDMA) technologies (e.g., CDMA2000 1x, and High Rate Packet Data (HRPD)), Wideband CDMA (WCDMA) technologies, and WiMAX (Worldwide Interoperability for Microwave Access).

Mobile UE devices operate on battery power and one of the key performance measures for mobile communication services is improved mobile power efficiency. One technique for reducing power consumption by mobile UE devices is discontinuous transmission (DTX) and discontinuous reception (DRX). DTX and DRX can be implemented by setting up the transmission and reception patterns and triggers so that a mobile UE only turns its RF transceiver on at certain periods, while staying in a sleep mode by shutting the RF modem off at other times. As such, a mobile UE does not continuously monitor signaling from a serving network and thus reduces its power consumption.

BRIEF DESCRIPTION OF THE DRAWINGS

Like reference symbols and designations in the various drawings indicate like elements.

DETAILED DESCRIPTION

Figure 1:
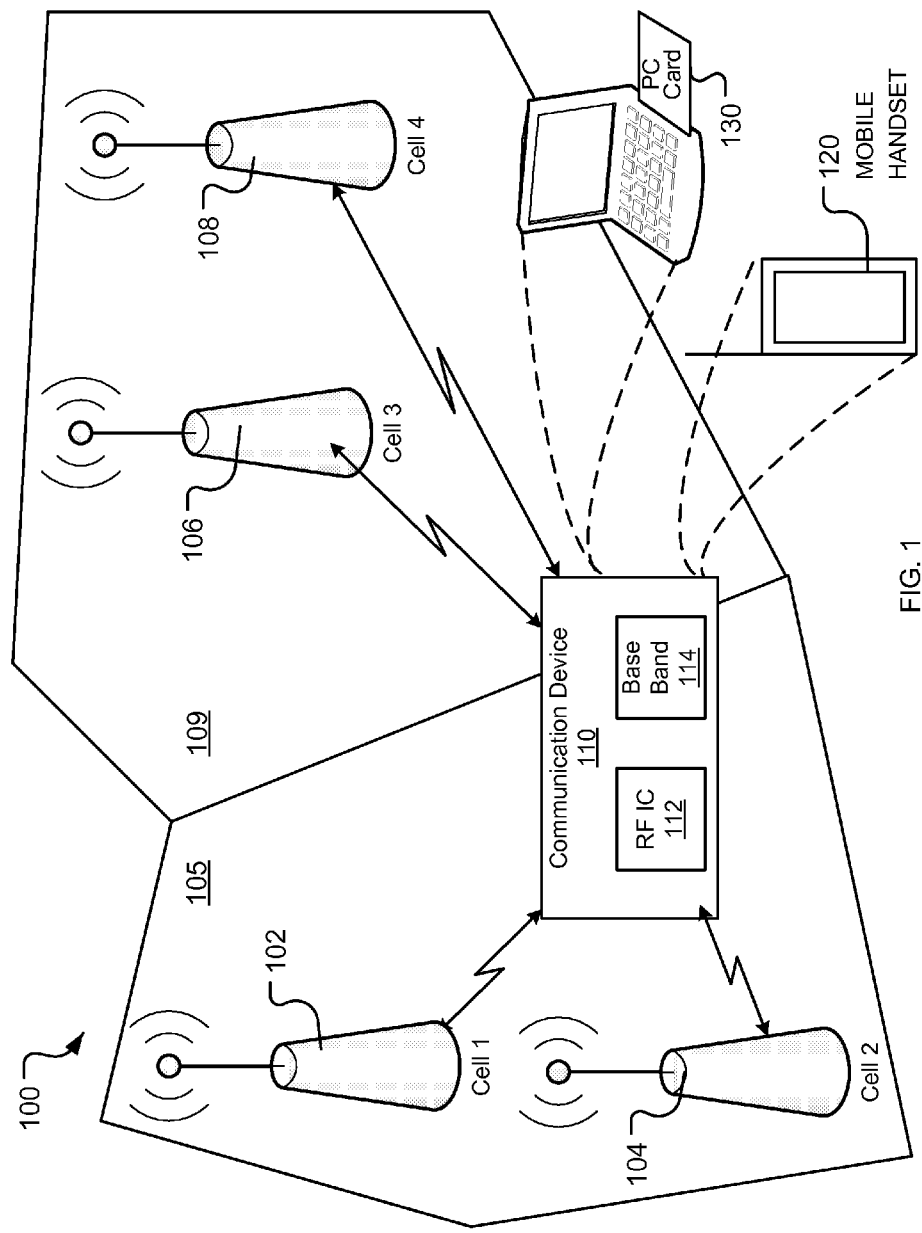
FIG. 1 is a block diagram of an exemplary system for establishing wireless communications.

In wireless communication standards, such as the 3rd Generation Partnership Project (3GPP) HSPA+ (e.g., REL7 and REL8), LTE and others, a mobile UE device (or communication device) can operate in a discontinuous reception and transmission (DRX/DTX) mode. While in the DRX/DTX mode, the mobile UE device can use gating patterns as a reference to turn off one or more device components to reduce power consumption. A gating cycle for a communication device can range, e.g., from a few tens of milliseconds to as short as few milliseconds. In some implementations, during the DRX/DTX mode of operation, the mobile UE device needs to monitor neighboring cells and decode the respective System Frame Numbers (SFNs) transmitted by these cells. This decoding process takes time and the duration of the decoding process depends on the number of cells broadcasting into an area where the mobile UE device is located at a given time. In such implementations, a full SFN decode cycle can take a significant amount of time, e.g., 30 millisecond. The RF transceiver will be active (or "ON") for the duration of the decode cycle. This prolonged RF ON time can increase power consumption by the communication device.

Techniques can be implemented to reduce battery power consumption by a wireless communication device while in a discontinuous reception and transmission (DRX/DTX) mode of operation. More specifically, the techniques described in this document can be implemented to reduce the total amount of RF ON time and to efficiently utilize the reduced RF ON time for monitoring cells near the mobile UE device. Further, the time needed for processing signaling received from the neighboring cells also is reduced.

In one implementation, while in the DRX/DTX mode of operation, in which the RF circuitry is turned on discontinuously (i.e., periodically), the mobile UE device can monitor the signal quality of the neighboring cells. The signal quality corresponding to a monitored cell can be used to qualify that cell for inclusion in a first set of active cells that service an area where the communication device is located. The first set of active cells may be a subset of all adjacent cells from which the communication device can receive detectable cell broadcast signals. Various techniques for determining the signal quality of a given cell can be implemented.

The mobile UE device can obtain a snapshot of broadcast signals transmitted by the first active set of cells, i.e., the cells qualified based on a signal quality measure. The snapshot can represent the RF environment at the location of the mobile UE device at that particular time. The obtained snapshot information is stored in a local storage device within the mobile UE device, such as a Random Access Memory (RAM) module. The mobile UE device can process the stored snapshot information during an off-period (a period during which the RF circuitry of the device is turned off) to decode the SFN information of each cell within the device's communication range. Accordingly, the signal quality of each cell can be used to identify cells for which the signal quality at the location of the mobile UE device is below a particular value. Thus, the total number of cells for which SFN decoding is performed can be reduced. By reducing the processing required to perform the SFN decoding process, the power consumption of the mobile UE device can be reduced. In addition, the decoded SFN can be used to further qualify a given cell in the first set of cells to be included in a second set of cells that can communicate with the communication device.

In addition to reducing power consumption and thereby extending the operational battery life of a mobile UE device, the DRX/DTX techniques can reduce cell interference and increase system capacity in a given cell. In the example of an HSPA+ deployment, the third generation partnership project (3GPP) release 7 specifications provide continuous packet connectivity (CPC) enhancements that support the DRX/DTX mode of operation, while continuous operation ("normal operation") is possible when needed. LTE and other standards also support a DRX/DTX mode of operation and thus can incorporate various technical features of the described techniques, apparatus and systems and associated examples in this document.

Wireless Network

FIG. 1 shows an exemplary system 100 for providing wireless communications between a communication device and neighboring cells in a wireless network. A cell in this and other examples can refer to the limited geographic area covered by the RF radiation emitted from a base station and may also be used to, interchangeably, refer to the base station of a cell. A mobile communication device 110 can be moving from an area 105 served by cell 1 (102) and cell 2 (104) to another area 109 served by cell 3 (106) and cell 4 (108). The mobile communication device 110 collects signals from adjacent cells, e.g., cells 102, 104, 106, and 108, and builds and maintains a list of active cells it is in communication with during its movement. In some implementations, an actual list of active cells need not be generated. Optionally, the mobile communication device 110 can store the name or identification of each cell in a given area of the wireless network and mark or otherwise identify a given cell as a good signal quality cell. Various factors, including the location of the communication device 110 respective to the cells 102, 104, 106 and 108 and the distance between the communication device 110 and those cells, can affect the communication quality. As the communication device 110 moves from area 105 to area 109, the communication device 110 can update the set of active cells.

The communication device 110 can be implemented as any one of various wireless devices including a mobile handset 120, a personal computer (PC) card 130 that interfaces with a PC, a laptop, or other any other such computing device that provides wireless communications.

The communication device 110 includes radio frequency (RF) circuitry or an RF front end 112 that can provide RF communication links with a wireless network through the one or more cells, e.g., cells 102, 104, 106 and 108. For example, the RF circuitry 112 can include an RF receiver that establishes a downlink (DL) with a base station and an RF transmitter that establishes an uplink (UL) with a base station. The communication device also includes baseband circuitry 114 that is connected to the RF circuitry 112 and can process input communication signals received through the RF circuitry 112 and provide output communication signals to be transmitted through the RF circuitry 112. The baseband circuitry 114 can support one or more communication standards, including 3GPP REL7 HSPA+, LTE, and other protocols in the HSPA family, such as High-Speed Downlink Packet Access (HSDPA) and High-Speed Uplink Packet Access (HSUPA) or Enhanced Uplink (EUL). Depending on the type of the communication device implemented, additional electronic components can be included in the baseband circuitry 114.

Communication Device Architecture

Figure 2A:
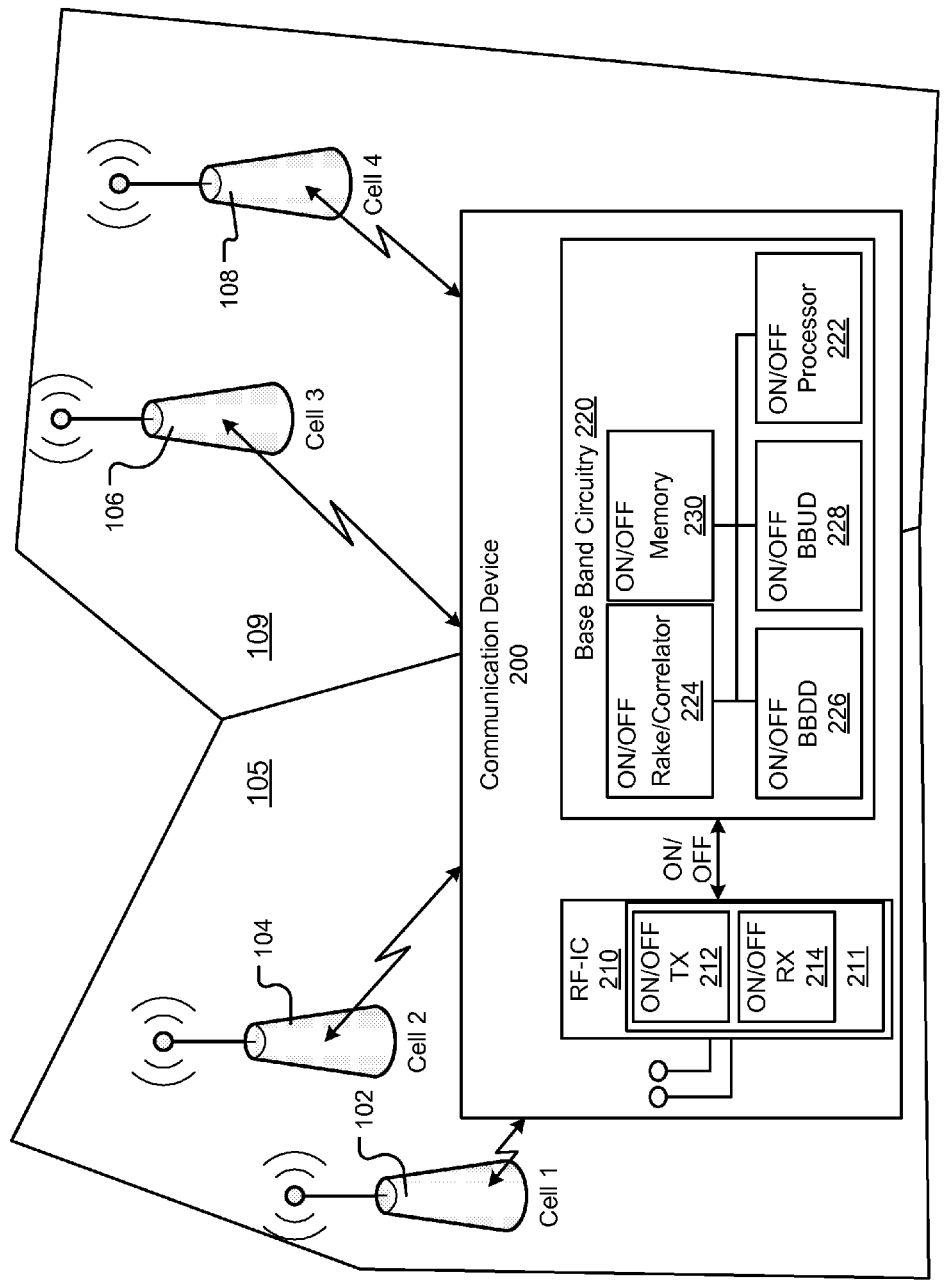
FIG. 2A is a block diagram of an exemplary communication device showing various device components or circuits.

FIG. 2A is a block diagram of an exemplary communication device 200 in an exemplary communication environment. The communication device 200 includes RF circuitry 210 connected to baseband circuitry 220. The RF circuitry 210 includes a radio transceiver module 211 for transmitting and receiving RF signals and interfaces, usually via a duplex filter, with the RF antenna module of the device. The RF circuitry 210 can include an RF transmitter (TX) 212 that transmits signals to one or more neighboring cells, e.g., cells 102, 104, 106 and 108 in a wireless network. The RF circuitry 210 also can include an RF receiver (RX) 214 that receives signals broadcast from one or more neighboring cells, e.g., cells 102, 104, 106 and 108. The transmitter 212 and receiver 214 include various RF components, such as amplifiers, filters, local oscillators and mixers/modulators. In operation, the transmitter 212 modulates and up-converts a baseband signal from the baseband circuitry 220 onto an RF carrier generated by a local oscillator within the transmitter 212 for RF transmission. Further, the receiver 214 filters and down-converts received RF signals into a signal to be processed by the baseband circuitry 220. The transmitter 212 and the receiver 214 may be independently turned on-and-off based on a mode of operation of the communication device 200. Moreover, either or both of the transmitter 212 and the receiver 214 can be turned on-and-off periodically to support a discontinuous reception and transmission (DRX/DTX) mode of operation. In some implementations, a single transceiver unit can replace the separate transmitter 212 and receiver 214.

The baseband circuitry 220 provides digital signal processing and control functions within the communication device 200. The baseband circuitry 220 includes a receive baseband module that filters and converts the analog signal received from the RF receiver 214 into a digital signal for further processing. The baseband circuitry 220 also includes a transmit baseband module that processes and converts a digital baseband signal into an analog signal that can be transmitted to the RF transmitter 212.

The baseband circuitry 220 can control the RF circuitry 210 to selectively turn either or both of the transmitter 212 and the receiver 214 on/off based on a mode of operation implemented by the communication device 200. In addition, either or both of the baseband circuitry 220 and the RF circuitry 210 can be turned on/off based on a mode of operation. For example, in a normal mode of operation, both the RF circuitry 210 and the baseband circuitry 220 can be turned on to establish a connection with one of the neighboring cells, e.g., to download data through the established connection and to process the downloaded data. In a DRX/DTX mode of operation, the baseband circuitry 220 can turn the RF circuitry 210 on to monitor signals broadcast by the one or more neighboring cells, e.g., cells 102, 104, 106 and 108. Then, the baseband circuitry 220 can turn the RF circuitry off to reduce power consumption while the baseband circuitry 220 processes the received signals. In some implementations, the RF circuitry 210 can be turned on for a portion of the time when the baseband circuitry 220 is turned on to process the received signals.

To support various functions of the baseband circuitry 220, a processor 222 is included to interface with and control operation of other components of the baseband circuitry 220. For example, a rake receiver/correlator 224 can be used to counter the effects of multipath fading by assigning each of various sub-receivers (or correlators) to a different multipath component of a signal. Each sub-receiver can independently decode a single multipath component of a signal, and the decoded signals from all sub-receivers can be combined. Also, DSP components, such as a baseband downlink decoder (BBDD) 226 and a baseband uplink decoder (BBUD) 228, can provide support for high speed protocols for downlink and uplink respectively, such as HSDPA and HSUPA.

The baseband downlink decoder 226 can be used to decode monitored signals received through the RF circuitry 220, e.g., to identify the SFN corresponding to each neighboring cell. Various types of baseband downlink decoder 226 can be used, based on one or more communication standards supported. For example, a Primary Common Control Physical Channel (PCCPCH) Viterbi decoder can be used to support 3GPP REL7 HSPA+. Also, a corresponding decoder can be used to support the LTE standard. The decoded signals or the raw monitored signals can be stored in a memory component 230. Various types of Random Access Memory (RAM) devices, Read Only Memory (ROM) devices, Flash Memory devices, and other suitable storage media can be used to implement the memory component 230. In addition, the memory component 230 can store other information and data, such as instructions, software, values, and other data processed or referenced by the processor 222.

Various components of the baseband circuitry 220 can be selectively turned on-and-off, either as a group or individually, to efficiently use the chip resources for handling various processing tasks while reducing overall chip power consumption. The processor 222 can control various operations of the remaining components in the baseband circuitry 220, including selectively turning these components on-and-off to support a particular mode of operation.

In some implementations, the RF circuitry 112 and the baseband circuitry 114 of the communication device 110 in FIG. 1 can be implemented to be substantially identical to the RF circuitry 210 and baseband circuitry 220, respectively.

Consider an example where the communication device 200 in FIG. 2A is moving from an area 105 served by cells 102 and 104 to another area 109 served by cells 106 and 108. Certain features and terms in the description of this and other examples are specific to Evolved High-Speed Packet Access (HSPA+) specifications (e.g., REL7), but the underlying techniques can be applicable to other wireless technologies, e.g., LTE and other technologies that support DRX/DTX mode operations.

Figure 2B:
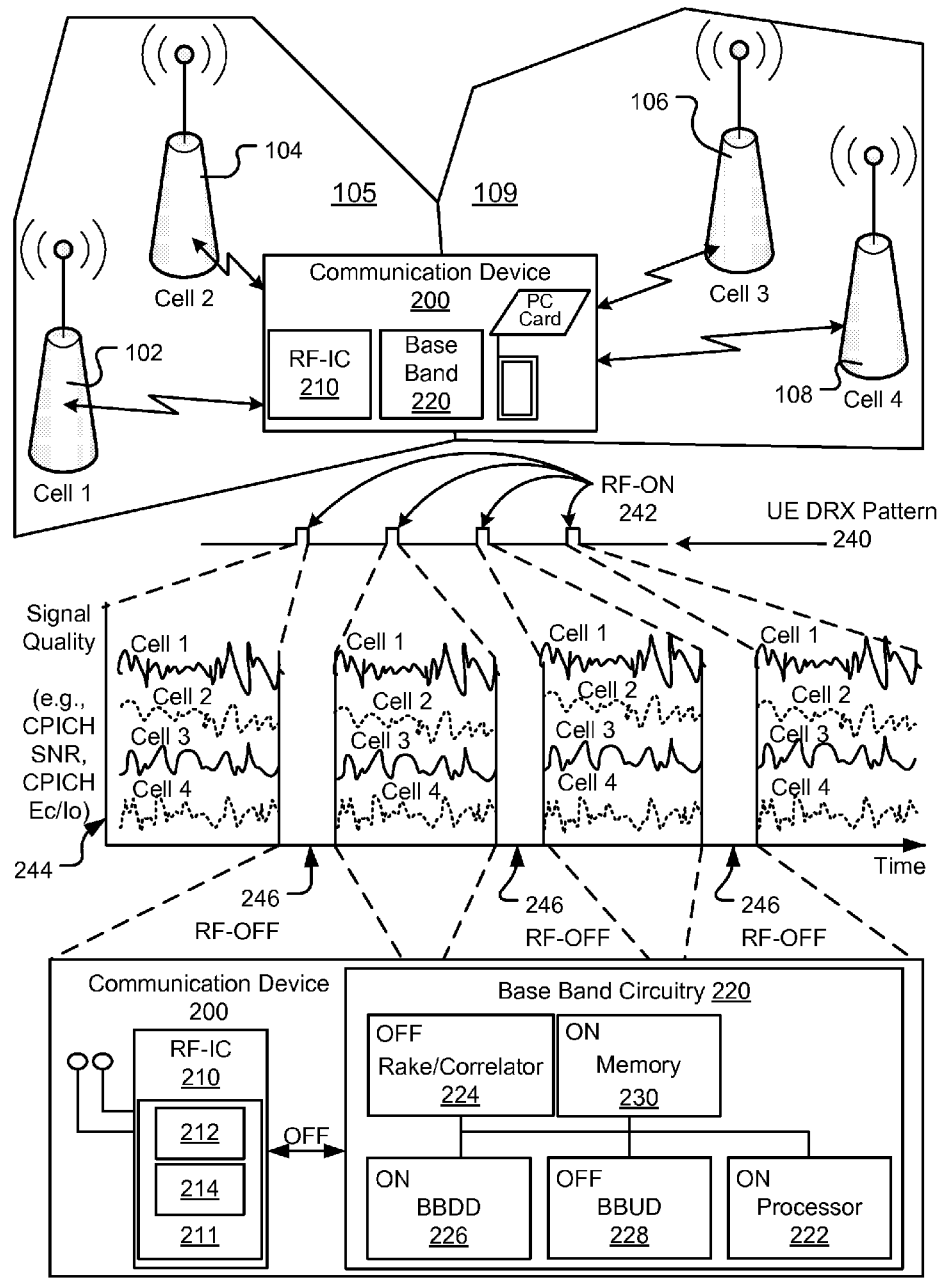
FIG. 2B provides an exemplary illustration of communication device operations in obtaining a snapshot of neighboring cells.

FIG. 2B illustrates exemplary operations of the communication device 200 in obtaining a snapshot of neighboring cells that have radio coverage at the location of the communication device 200. The communication device 200 can operate in a DRX/DTX mode to discontinuously monitor the neighboring cells 102, 104, 106 and 108 while moving between area 105 and area 109. Further, the communication device 200 can shift between a non-DRX/DTX mode in which the RF circuit 210 is continuously on and the DRX/DTX mode based on a negotiation with the cell to which it is connected. For example, the communication device 200 initially can be connected to cell 102 and can operate in the non-DRX/DTX mode to download web content corresponding to a web page. During operation in the non-DRX/DTX mode, both the RF circuitry 210 and the baseband circuitry 220 can be turned on. Once the web content has been downloaded and the communication device 200 is idling (e.g., the user is reading the downloaded content), the cell 102 can determine that the communication device 200 can enter the DRX/DTX mode to conserve power until the communication device 200 initiates the downloading of additional content or otherwise retrieves data from the network.

When operated in the DRX/DTX mode, the communication device 200 can discontinuously, e.g., periodically, turn either or both of the RF circuitry 210 and the baseband circuitry 220 on-and-off as needed. An exemplary DRX gating pattern 240 is shown having four on-periods 242, during which the RF circuitry 210 is turned on. During the on-periods 242, the RF circuitry is turned on to monitor broadcast signals, such as the Common Pilot Channel (CPICH) and various broadcast channels. During each on-period 242, the monitored signals from the neighboring cells can be used to analyze their time dependent signal qualities 244, such as the CPICH signal-to-noise ratio (SNR), the CPICH power-to-total noise power ratio ($E_C/I_O$), the received signal code power (RSCP) measurement of the CPICH (CPICH RSCP), and/or any other signal quality parameters.

In this example, the four exemplary on-periods 242 are separated by off-periods 246, during which the RF circuitry 210 is turned off. During the off-periods 246, the communication device 200 can turn the RF circuitry 210 and some, most, or all of the baseband circuitry 220 components off. For example, the processor 222, the memory 230 and the baseband downlink decoder 226 can be turned on while turning off the rake receiver 224 and the baseband uplink decoder 228. The baseband downlink decoder 226 can decode the monitored signals from the neighboring cells 102, 104, 106 and 108, and the processor can store the decoded signals in the memory unit 230. The stored decoded signals can be processed later by the processor 222 to identify the SFN for each cell, for example.

Cell Handoff During DRX/DTX Mode

Figure 3A:
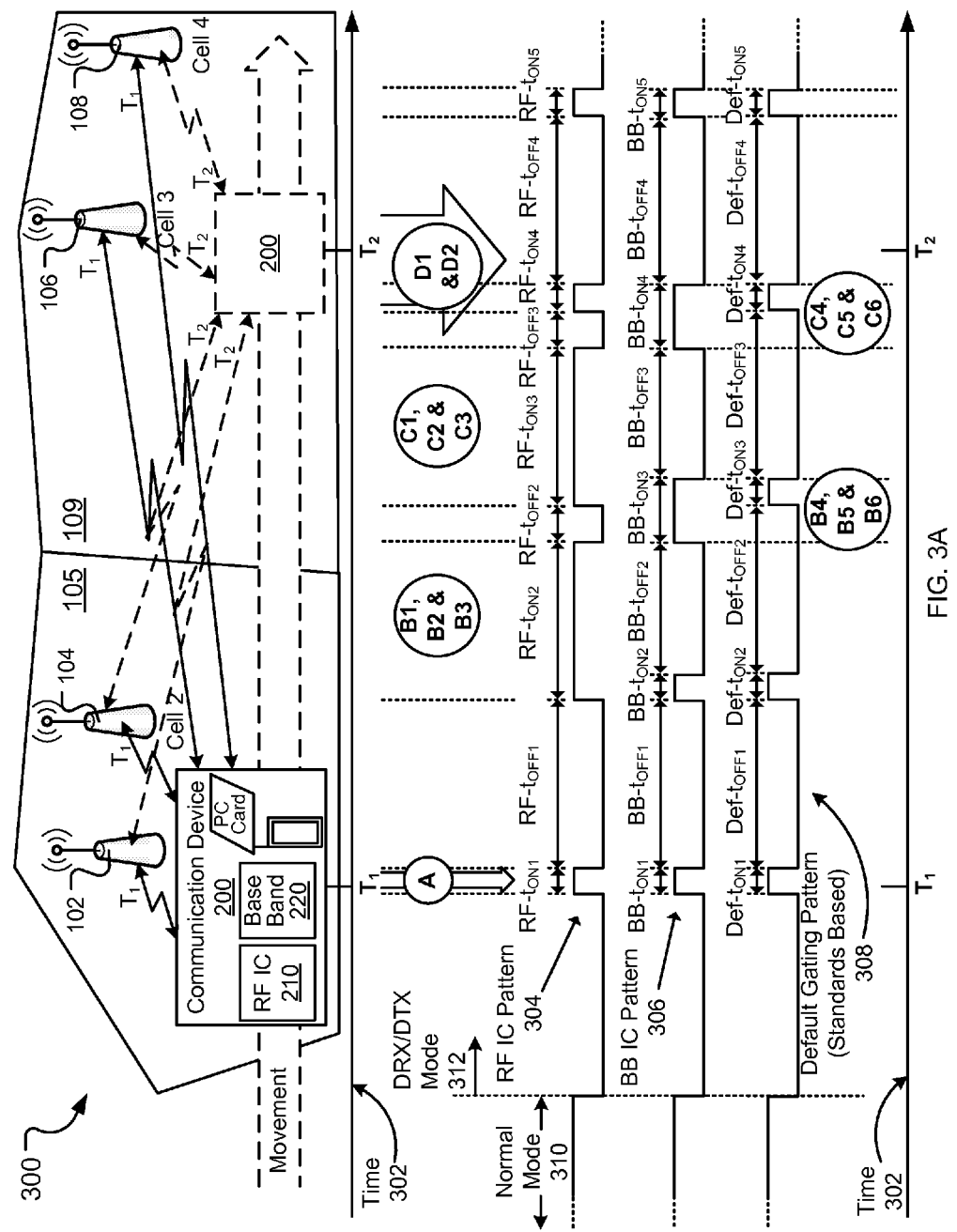
FIG. 3A is a block diagram of an exemplary communication device operating in a discontinuous reception and transmission mode as the communication device is in motion.

FIG. 3A is a block diagram 300 of an exemplary communication device operating in a discontinuous reception and transmission (DRX/DTX) mode while in motion. In this example, the communication device 200 has transitioned from a non-DRX/DTX operation mode 310 to a DRX/DTX mode 312 before time $T_1$. The communication device 200 operates in the DRX/DTX mode 312 while moving from a first location adjacent to cells 102 and 104 at time $T_1$, to a second location, different from the first location, adjacent to cells 106 and 108 at time $T_2$. Movement by the communication device 200 further requires a hand-off of the communication device 200 from a first serving cell (e.g., one of cells 102 and 104) at $T_1$ to a second serving cell (e.g., one of cells 106 and 108) at time $T_2$.

The communication device 200 includes RF circuitry 210 and baseband circuitry 220 to communicate with the neighboring cells, e.g. cells 102, 104, 106 and 108 in a wireless network. As the communication device 200 moves from the initial location at $T_1$ to the subsequent location at $T_2$, the neighboring cells 102, 104, 106 and 108 are discontinuously monitored by the communication device 200 to identify cells that can establish a viable network connection with the communication device 200. At each period when the RF circuitry 210 is turned on, the communication device 200 monitors the neighboring cells to obtain information that subsequently can be processed during one or more off-periods.

Under the 3GPP REL7 HSPA+ standard, the physical layer channel, High Speed-Shared Control Channel (HS-SCCH), is provided to allow a base station to inform the user communication device 200 that data is being sent on the physical layer channel High-Speed Downlink Shared Channel (HS-DSCH). The physical layer Uplink High Speed-Dedicated Physical Control Channel (HS-DPCCH) carries acknowledgment information and the current channel quality indicator (CQI) of the user. This CQI is used by the base station to calculate the amount of data to be sent during the next transmission. The physical layer High Speed-Physical Downlink Shared Channel (HS-PDSCH) is the channel mapped to the above HS-DSCH transport channel that carries actual user data. For the DRX/DTX mode of operation, a default gating pattern 308 for operating in the DRX/DTX mode is shown at the bottom of FIG. 3A. This default gating pattern 308 can be included in the HS-SCCH burst pattern in the HS-SCCH channel and represents a standard required minimum on duration and an on pattern for the RF circuitry 210 in the communication device 200. The gating pattern of on and off durations for the RF circuitry 210 in the communication device 200 is designed to comply with the gating pattern 308 and to provide sufficiently long on durations in which to capture sufficient RF information corresponding to neighboring cells in the network for the DRX/DTX mode of operation to perform a hand-off from one cell to another while achieving high efficiency in battery power use.

The described techniques for the DRX/DTX mode of operation can be applied to different wireless communication technologies, such as HSPA+ (e.g., REL7 and REL8), LTE, and others. As such, the default gating pattern 308 can vary with the applicable communication standard being employed, such as HSPA+ and LTE. For example, each default on-period (Def-$t_{ON1}$, Def-$t_{ON2}$, Def-$t_{ON3}$, Def-$t_{ON4}$, and Def-$t_{ON5}$) can last substantially 2 ms under the 3GPP REL7 HSPA+ standard. Further, default on-periods can be separated by default off-periods (Def-$t_{OFF1}$, Def-$t_{OFF2}$, Def-$t_{OFF3}$, and Def-$t_{OFF4}$). Each default off-period can last as long as 40 ms under the 3GPP REL7 HSPA+ standard.

In FIG. 3A, an exemplary baseband gating pattern 306 is shown above the default gating pattern 308. The exemplary baseband gating pattern 306 is shown with five baseband on-periods (BB-$t_{ON1}$, BB-$t_{ON2}$, BB-$t_{ON3}$, BB-$t_{ON4}$, and BB-$t_{ON5}$) that are separated by four baseband off-periods (BB-$t_{OFF1}$, BB-$t_{OFF2}$, BB-$t_{OFF3}$, and BB-$t_{OFF4}$). The duration of each baseband on-period and each baseband off-period can vary based on the operation of the communication device 200 at a given time. An exemplary RF gating pattern 304 is shown above the BB gating pattern 306 and includes five RF on-periods (RF-$t_{ON1}$, RF-$t_{ON2}$, RF-$t_{ON3}$, RF-$t_{ON4}$, and RF-$t_{ON5}$) separated by four baseband off-periods (RF-$t_{OFF1}$, RF-$t_{OFF2}$, RF-$t_{OFF3}$, and RF-$t_{OFF4}$). The duration of each RF-on-period and off-period can vary based on the operation of the communication device 200 at a given time.

As the communication device 200 operates in the DRX/DTX mode 312 while moving from the first location at time T1 to the second location at time T2, the processes performed during the on-periods and the off-periods are shown in FIG. 3A. The process for monitoring the neighboring cells at the first exemplary on-period is represented by the letter 'A.' The subsequent processes performed during the second exemplary on and off periods are represented by B1, B2, B3, B4, B5 and B6. The processes performed during the third exemplary on and off periods are represented by C1, C2, C3, C4, C5 and C6. The processes performed during the fourth exemplary on and off periods are represented by D1, D2, D3, D4, D5 and D6.

Initial Monitoring of Neighboring Cells

Figure 3B:
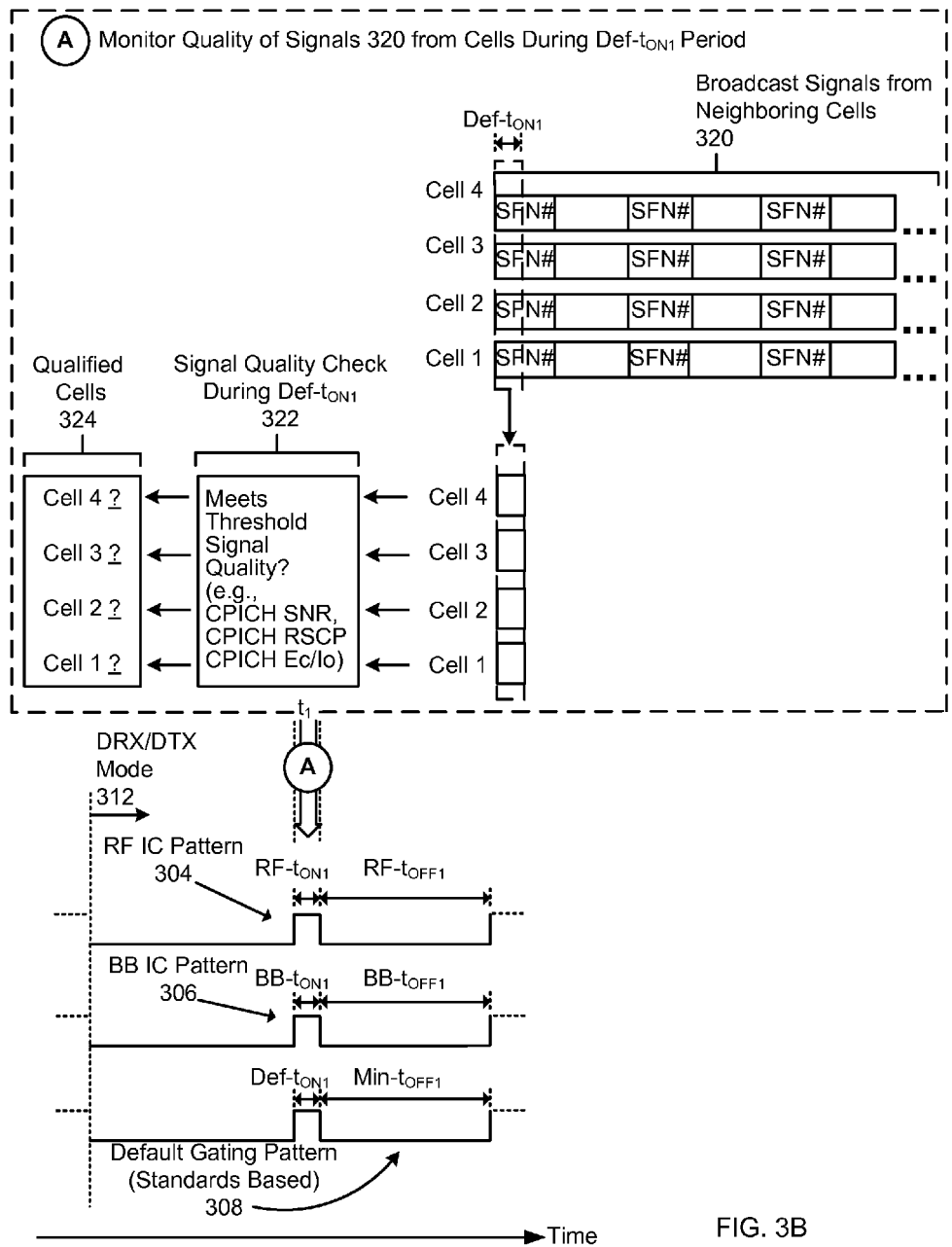
FIG. 3B is a block diagram of an exemplary communication device process for making an initial determination of the quality of signals broadcasted by neighboring cells during a first connected period to qualify one or more cells for inclusion into a first selection of cells.

The process of monitoring the signal quality of the neighboring cells by the moving communication device 200 is represented by the letter 'A' in FIG. 3A and further described with respect to FIG. 3B. FIG. 3B is a block diagram of an exemplary communication device process for making an initial determination of the quality of signals broadcasted by neighboring cells during the first connected period to identify cells to include in a first selection of cells (or first active set of cells). For the example shown in FIG. 3B, at time $T_1$, the communication device 200 is located closer to (or in line-of-sight with) cells 102 and 104 than to cells 106 and 108. Also, the communication channel may be too far away from (or out of line-of-sight with) cells 106 and 108. Concurrent with or overlapping with time $T_1$, the RF circuitry 210 and the baseband circuitry 220 of the communication device 200 can be turned 'on' for the first on-period (Def-$t_{ON1}$, BB-$t_{ON1}$, or RF-$t_{ON1}$) in the DRX/DTX mode 312 to monitor the signal quality of the signals broadcast by the neighboring cells 102, 104, 106 and 108. The monitored signal qualities of the signals broadcast from the neighboring cells can be used to identify one or more of the neighboring cells to include in an initial selection of qualified cells that can be connected to the communication device 200.

To monitor the signal qualities of the neighboring cells, the signals 320 broadcast from the neighboring cells within the communication range of the communication device 200 are analyzed during the short duration of the first default on-period, Def-$t_{ON1}$. The signals broadcast from the neighboring cells are analyzed during Def-$t_{ON1}$ to obtain one or more signal quality parameters, such as CPICH SNR, CPICH RSCP, and CPICH Ec/Io. The obtained one or more signal quality parameters for the neighboring cells are compared against a threshold value (322) to qualify one or more cells (324) from the neighboring cells to be included in an initial (or first) selection of cells that can be connected to the communication device 200. In some instances, the threshold can be selected such that a signal quality value must exceed the threshold for the cell to be included. In some other instances, the threshold can be selected such that a cell can be included in the signal quality value meets or exceeds the threshold.

Subsequent Monitoring of Neighboring Cells

Figure 3C:
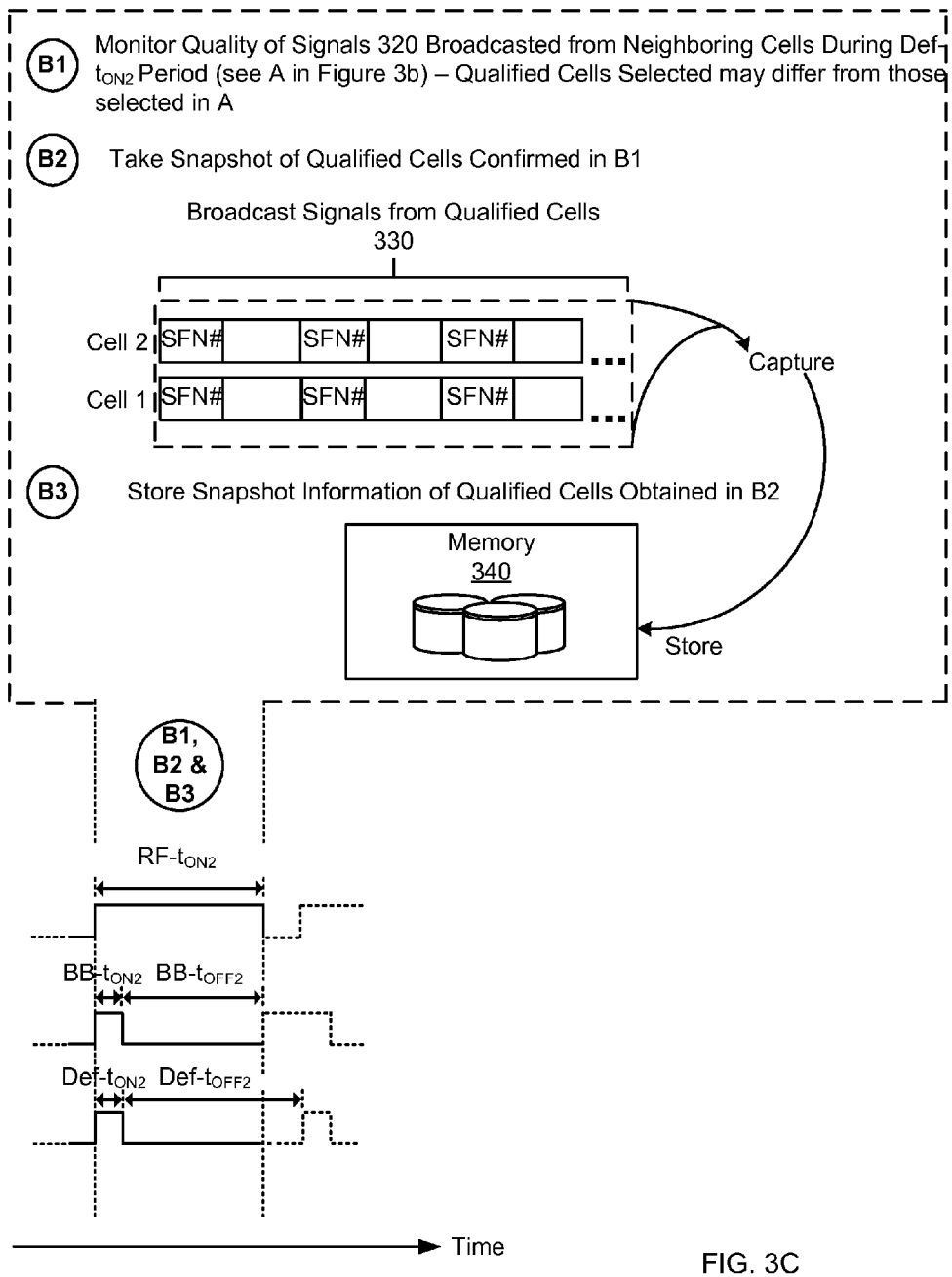
FIG. 3C is a block diagram of an exemplary communication device performing additional monitoring of the quality of signals broadcast by neighboring cells during a second connected period to identify cells to be included in the first selection of cells and taking snapshot information corresponding to the first selection of cells.

FIG. 3C is a block diagram of an exemplary communication device performing additional monitoring of the quality of signals broadcast by neighboring cells during a second connected period to identify cells to be included in the first selection of cells and taking snapshot information corresponding to the first (or initial) selection of cells. While the RF circuitry 210 of the communication device 200 can be turned back on before the next default on-period (Def-$t_{ON2}$) to obtain a snapshot of the RF signals broadcast from the first selection of qualified cells, waiting until Def-$t_{ON2}$ to turn the RF circuitry on can reduce power consumption. During Def-$t_{ON2}$, the baseband circuitry 220 can be turned on (BB-$t_{ON2}$) along with the RF circuitry 210 (RF-$t_{ON2}$) to obtain the snapshot information. Before obtaining the snapshot information for the qualified cells, the signal qualities of the neighboring cells can be monitored again to update the first selection of cells based on the signal quality monitored during Def-$t_{ON2}$ (B1). Because the communication device 200 may have moved away from the initial location by this time, the first selection of cells obtained during Def-$t_{ON2}$ could be different from those selected in 'A.' Therefore, performing additional monitoring of qualified cells after the initial monitoring ensures the proper active cells are identified for hand-off.

The RF circuitry 210 can be turned on for a longer duration (RF-$t_{ON2}$) than Def-$t_{ON2}$ as needed to obtain the desired snapshot information of the RF signals broadcast from the first selection of qualified cells 330 (e.g., qualified based on signal quality comparison to a threshold value as described in FIG. 3B) (B2). In the example shown in FIG. 3C, cells 1 and 2 have been identified as the first selection of qualified cells. The RF circuitry 210 is kept on to obtain the snapshot information for a duration (RF-$t_{OFF2}$) that is shorter than the maximum default off-period (Def-$t_{OFF2}$). For example, under the 3GPP REL7 HSPA+ standard, RF-$t_{OFF2}$ can last approximately 30 ms, and Def-$t_{OFF2}$ can last approximately 40 ms. The snapshot information can include frames of CPICH and broadcast channels, for example. The obtained snapshot information for the first selection of qualified cells are stored (B3) in a local memory device 340. In some implementations, the memory device 340 can be implemented to be substantially similar to the memory device 230 described with respect to FIGS. 2A and 2B.

Figure 3D:
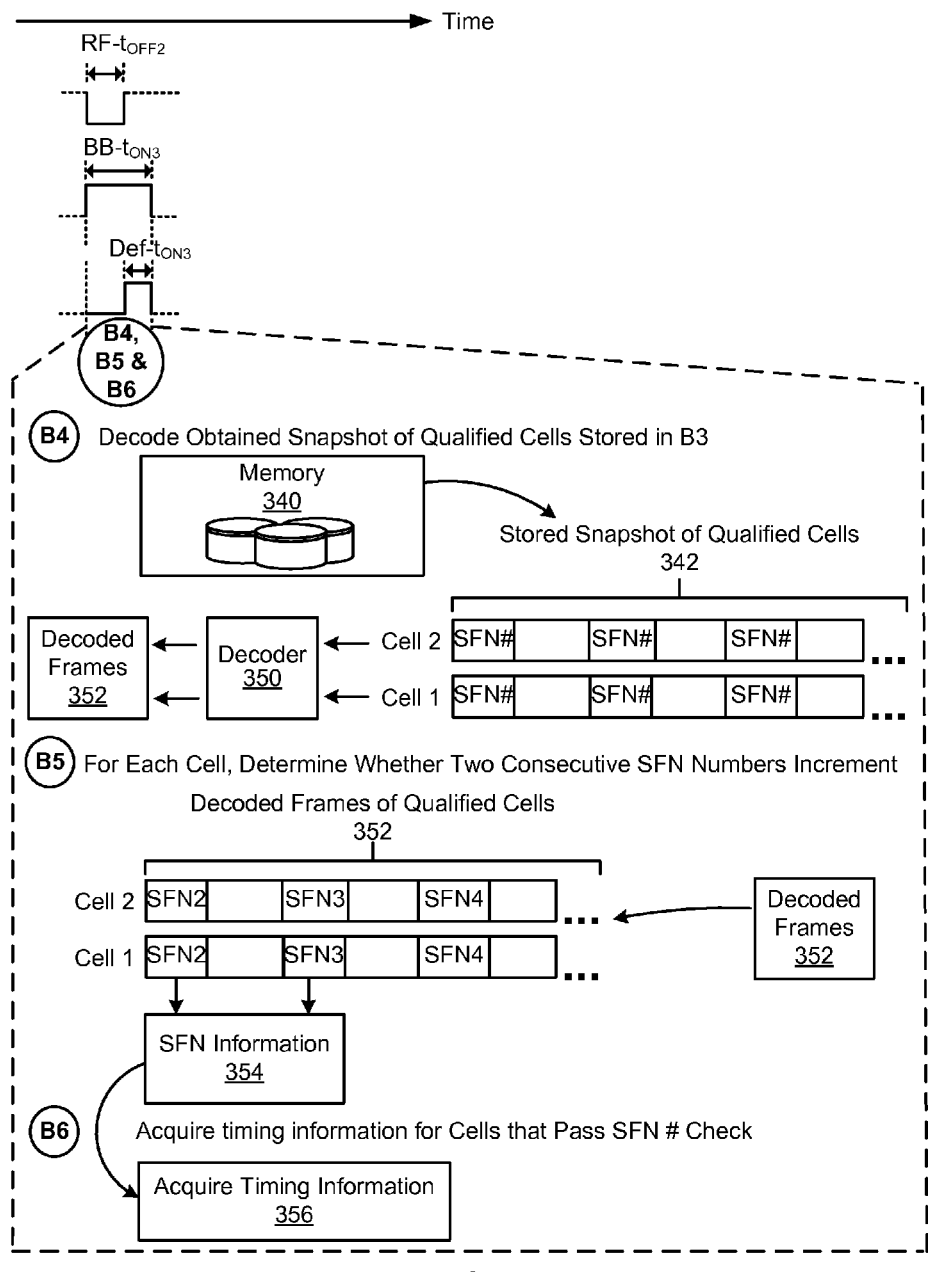
FIG. 3D is a block diagram of an exemplary communication device decoding SFN information for the first selection of cells qualified during the second connected period to identify cells to be included in a second selection of cells.

FIG. 3D is a block diagram of an exemplary communication device 200 decoding SFN of the first selection of cells identified during the second connected period to identify cells to include in a second selection of cells (or second active set of cells). Once the snapshot information has been stored in B3, the baseband circuitry 220 can be turned on (BB-$t_{ON3}$) to process the stored snapshot information while the RF circuitry 210 is turned off (RF-$t_{OFF2}$) to conserve power. The RF circuitry 210 can remain turned off for all or part of the duration of BB-$t_{ON3}$, based on the time used to obtain and store the snapshot information and the time needed to process the stored snapshot information. The stored snapshot information is processed by the baseband circuitry 220 to identify one or more cells from the first selection of cells that are qualified to be included in the second selection of connectable cells. The second selection of cells is qualified based on the corresponding SFN information. The method of processing the stored snapshot information of the first selection of qualified cells is represented as B4, B5 and B6 in FIG. 3A and described further with respect to FIG. 3D.

In the example shown in FIG. 3D, the stored snapshot of the first selection of qualified cells 342 includes cells 1 and 2. The stored snapshot information for qualified cells 1 and 2 is obtained from the memory device 340 and decoded using a decoder 350 to obtain decoded frames (B4). In some implementations, the decoder 350 can be implemented to be substantially similar to the baseband downlink decoder 226 described with respect to FIGS. 2A and 2B.

The decoded frames 352 of the first selection of qualified cells are analyzed to determine whether the SFN 354 increments across two consecutive frames (B5). Detecting that the SFN 354 increments across at least two consecutive frames can indicate that the received snapshot information has been properly received and correctly decoded. To analyze the SFN 354, the processor (e.g., processor 222) of the communication device 200 can process the SFN prime (e.g., first 16 bits) of each decoded frame. For each cell that passes the SFN 354 check, the corresponding timing information 356 can be obtained so that cell can be included in the second selection of connectable cells qualified based on the SFN 354 (B6). In addition, the SFN 354 check for a cell can be independent of the cyclic redundancy check (CRC). Thus, whether or not the decoded frames pass the CRC error detecting process, any cell whose SFN 354 is incremented between snapshots can be included in the second selection of connectable cells at B6.

The above described processes for 1) monitoring the signals from the neighboring cells, 2) identifying one or more of the neighboring cells as a first selection of qualified cells based on signal quality, 3) obtaining snapshot information corresponding to the first selection of cells, and 4) processing the obtained snapshot information to filter the first selection of qualified cells to identify a second selection of qualified cells with which the communication device 200 can connect, can be repeated, e.g., periodically, during the DRX/DTX mode. For example, during the next on-period (Def-$t_{ON3}$), the RF circuitry 210 can be turned on (RF-$t_{ON3}$) to monitor signals broadcast by the neighboring cells and to identify cells to be selected based on the signal quality.

Figure 3E:
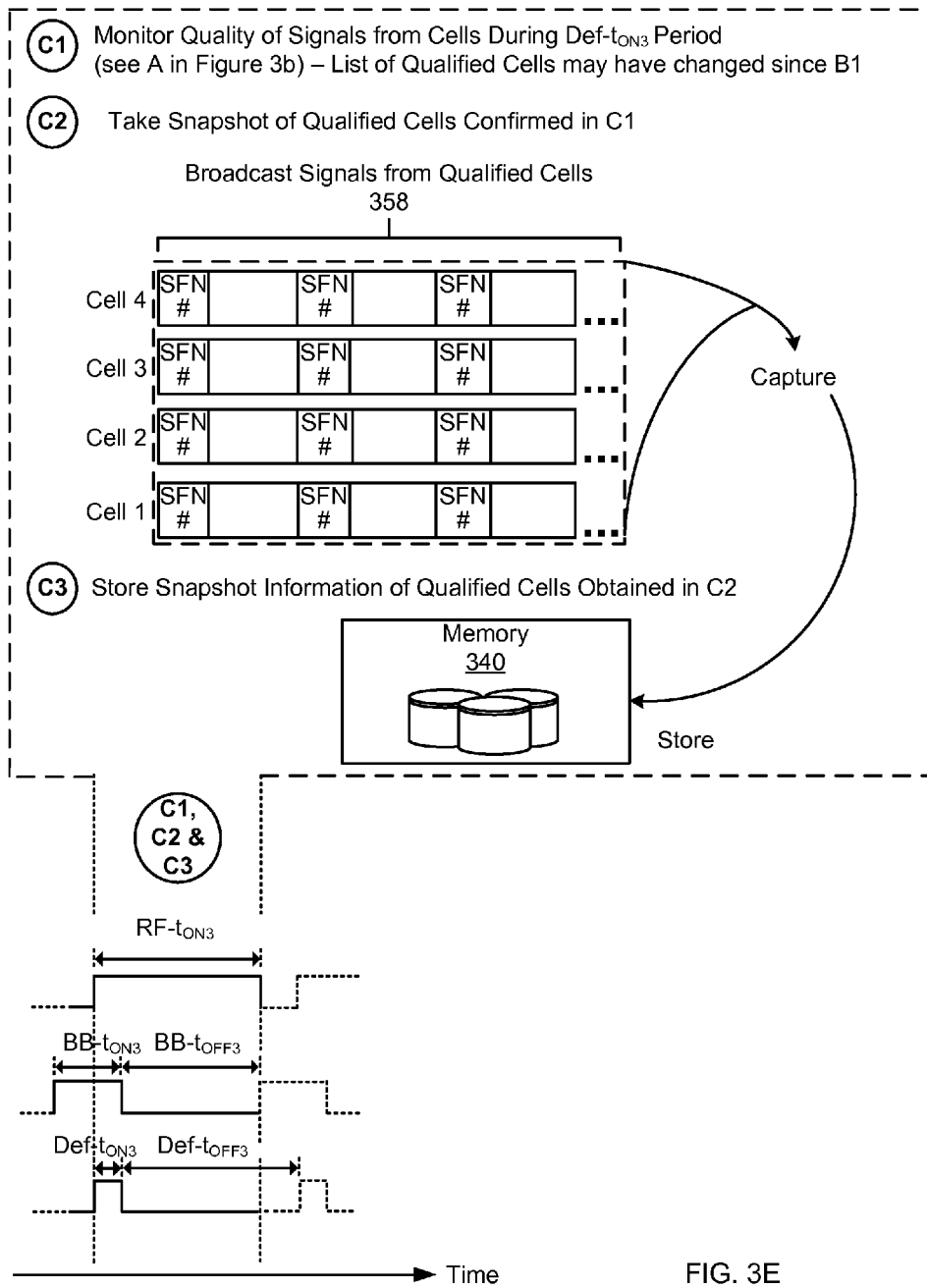
FIG. 3E is a block diagram of an exemplary communication device monitoring a signal quality of signals broadcast by neighboring cells during a third connected period to identify cells that are to be included in a first selection of cells and capturing snapshot information corresponding to the first selection of cells.

FIG. 3E is a block diagram of an exemplary communication device that is monitoring signal qualities of signals broadcast by neighboring cells during a third connected period to identify cells that are to be included in a first selection of cells and capturing snapshot information corresponding to the first selection of cells.

Because the communication device 200 is moving from the initial location at time $T_1$ towards the subsequent location, the qualified cells at this time can be different from those selected during Def-$t_{ON2}$. Thus, the RF circuitry 210 can be turned on to monitor the signal quality of neighboring cells at this particular time (C1). Based on this new monitoring, one or more of the neighboring cells can be included in the first selection of cells that are qualified based on signal quality. The RF circuitry 210 can remain on for a longer duration than the default on-period (Def-$t_{ON3}$) or the baseband on-period (BB-$t_{ON3}$) as needed to obtain snapshot information of the RF signals broadcast by the first selection of cells that are newly qualified based on the signal quality observed at C1 (e.g., qualified based on signal quality comparison to a threshold value as described in FIG. 3B) (C2). In the example shown in FIG. 3E, cells 1, 2, 3 and 4 have been identified as the first selection of qualified cells. The change in the first selection of cells from B1 to C1 can be due to the movement of the communication device 200.

In some implementations, the communication device 200 may not have moved significantly enough from B1 to C1 to have caused a change in the first selection of cells if the second on-period (RFt$_{ON3}$) and the third on-period (RFt$_{ON3}$) are consecutive on-periods during the DRX/DTX mode. This is because the time duration between two consecutive on-periods can be short, e.g., lasting only tens of milliseconds (e.g., approximately 40 ms). The example shown in FIG. 3A provides different potential changes in the RF environment for illustrative purposes, and thus the various on- and off-periods need not represent actual consecutive periods. In some implementations, the third on-period (RFt$_{ON3}$) for the RF circuitry can actually represent the 300th on-period, the 3000th on-period, etc. with the time duration between the second exemplary on-period and the third exemplary on-period in FIG. 3A lasting minutes, hours, days, etc., rather than milliseconds. Further, the communication device 200 can travel in a manner significant enough to cause a change in the first selection of cells from B1 and C1 if the duration between B1 and C1 is measured in minutes, hours or days.

The snapshot information obtained for the new first selection of qualified cells is stored (C3) in the local memory device 340. The snapshot information for the qualified cells can include frames of CPICH and descriptors for broadcast channels, for example. Compared to the stored first selection of qualified cells in B3, the newly qualified first selection of cells stored in C3 includes two additional cells, cells 3 and 4.

Figure 3F:
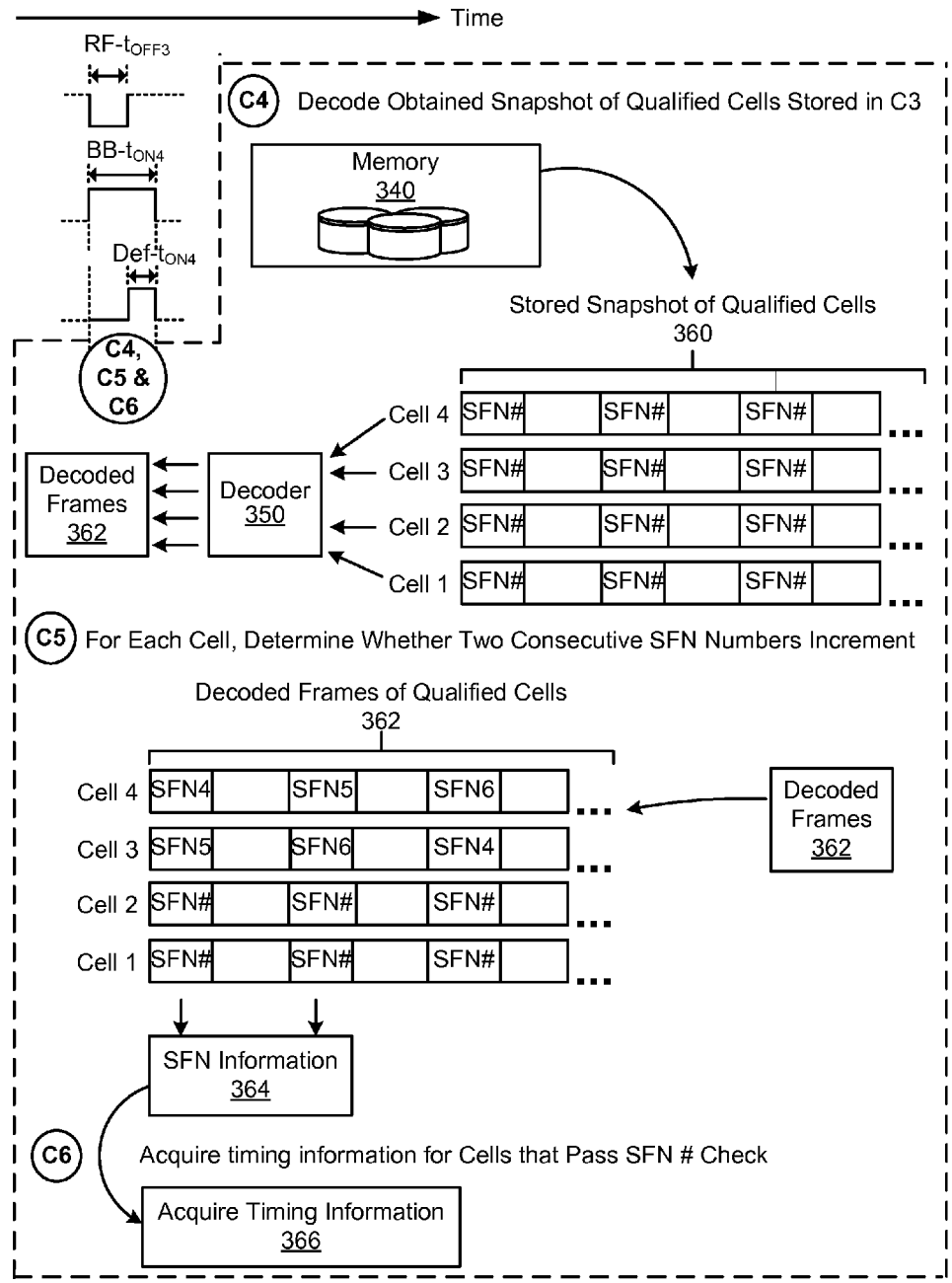
FIG. 3F is a block diagram of an exemplary communication device decoding SFN information for the first selection of cells qualified during the third connected period to identify cells to be included in a second selection of cells.

FIG. 3F is a block diagram of an exemplary communication device decoding the SFNs of the first selection of cells qualified during the third on-period and identifying cells from the first selection to include in a second selection of cells based on their SFNs. Once the snapshot information has been stored in C3, the baseband circuitry 220 can be turned on (BB-$t_{ON4}$) to process the stored snapshot information while the RF circuitry 210 is turned off (RF-$t_{OFF3}$) to conserve power. The RF circuitry 210 can remain off for all or part of the duration of BB-$t_{ON4}$ based on the time used to obtain and store the snapshot information and the time needed to process the stored snapshot information. The stored snapshot information is processed to identify one or more cells from the first selection of cells that are qualified to be included in a second selection of connectable cells. The second selection of cells is qualified based on the corresponding SFN information. The method of processing the stored snapshot information of the first selection of qualified cells is represented as C4, C5 and C6 in FIG. 3A and described further with respect to FIG. 3F.

In the example shown in FIG. 3F, the stored snapshot of the first selection of qualified cells 342 includes cells 1, 2, 3 and 4. The stored snapshot information for qualified cells 1, 2, 3 and 4 in the first selection 360 are obtained from the memory device 340 and decoded using a decoder 350 to obtain decoded frames 362 (C4). In some implementations, the decoder 350 can be implemented to be substantially similar to the baseband downlink decoder 226 described with respect to FIGS. 2A and 2B. The decoded frames 362 of the first selection of cells qualified in C1 are analyzed to determine whether the SFN information 364 was incremented between two consecutive frames (C5). To analyze the SFN information 364, the processor (e.g., processor 222) of the communication device 200 can process SFN prime (e.g., first 16 bits) from each decoded frame. For cells that pass the SFN information 354 check, the corresponding timing information 366 can be obtained to include those cells in the second selection of connectable cells qualified based on the SFN 364 information (C6). In addition, the SFN information 364 check for a cell can be independent of the cyclic redundancy check (CRC). Thus, whether or not the decoded frames pass the CRC error detecting process, any cell for which the SFN 364 increments can be included in the second selection of connectable cells at C6.

Figure 3G:
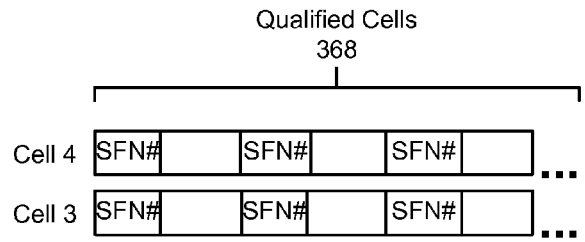
FIG. 3G is a block diagram of an exemplary communication device monitoring a signal quality of neighboring cells during a fourth connected period to identify cells to include in a first selection of cells and taking snapshot information of the first selection of cells.
Figure 3G:
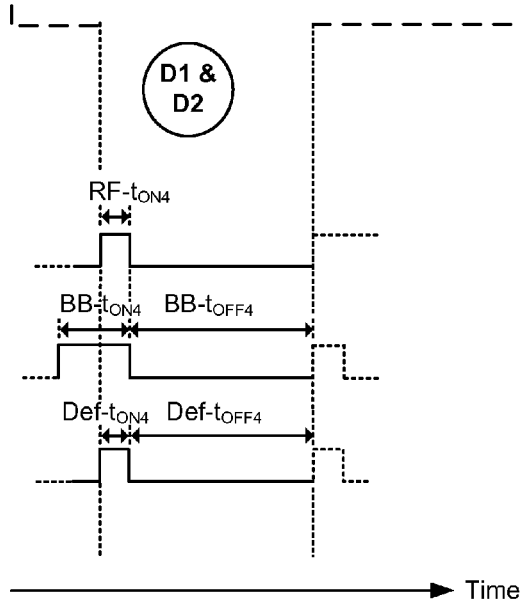

During the next on-period (Def-$t_{ON4}$), the RF circuitry can be turned on (RF-$t_{ON3}$) to monitor the neighboring cells and to identify cells to be selected based on the signal quality. FIG. 3G is a block diagram of an exemplary communication device monitoring signal qualities of signals broadcast by neighboring cells during a fourth connected period to identify cells to include in a first selection of cells and to obtain snapshot information of the first selection of cells.

At time $T_2$ in the example shown in FIGS. 3A and 3G, the communication device 200 may have moved from the initial location at time $T_1$ to the second location. The qualified cells at this time can be different from those selected during Def-$t_{ON3}$. Thus, the RF circuitry 210 can be turned on to monitor the signal quality of neighboring cells at this time (D1). Based on this new monitoring, one or more cells of the neighboring cells can be included in the first selection of cells qualified based on the signal quality. In the example shown in FIG. 3G, cells 3 and 4 have been identified as the first selection of qualified cells. The change in the first selection of cells from C1 to D1 can be due to the movement of the communication device 200. Having detected the qualified cells, the communication 200 can initiate handover to one of the cells qualified in D1 (D2). As shown in FIG. 3G, the RF-$t_{ON4}$ lasts for the duration of Def-$t_{ON3}$ and the RF circuitry promptly turns off. The handover initialization (D2) can be started when the RF circuitry is still turned on, or in some implementations, the handover initialization can start when the RF circuitry is turned off (RF-$t_{OFF4}$)

As described with respect to C1, the various on- and off-periods need not represent actual consecutive periods. In some implementations, the fourth on-period (RFt$_{ON3}$) for the RF circuitry can actually represent the 400th on-period, the 4000th on-period, etc., with the time duration between the third exemplary on-period and the fourth exemplary on-period in FIGS. 3A and 3G lasting minutes, hours, days, etc., rather than milliseconds. The communication device 200 is more likely to travel a significant distance to cause a change in the first selection of cells from C1 and D1 if the duration between B1 and C1 is measured in minutes, hours, or days.

The communication device 200 can communicate with any cell in the secondary location qualified based on the signal quality determined in D1 and previously decoded and stored SFN (and qualified based on signal quality during the first selection) when performing handoff from a previous cell to prevent dropped calls, for example. Also, the stored timing information obtained during the previous off period can be used to connect with one of the qualified cells. In the example shown in FIGS. 3A-3G, the communication device 200 is moving from a first area covered by cells 1 and 2 at time $T_1$ to a second area, different from the first area, covered by cells 3 and 4 at time $T_1$. As described with respect to FIGS. 3A, 3B and 3C, the communication device 200 initially identifies cells 1 and 2 as qualified cells based on the signal quality and the SFN information. Thus, the communication device can be connected to either cell 1 or cell 2 at this time. As the communication device 200 moves away from the initial area, the communication device 200 can move closer to an area covered by cells 3 and 4. As described with respect to FIGS. 3A, 3E, and 3F, the communication device 200 can now identify cells 3 and 4 in addition to cells 1 and 2 as being qualified cells based on the signal quality and SFN information.

At time $T_2$, the communication device has now entered the area covered by cells 3 and 4 and is leaving the area covered by cells 1 and 2. Accordingly, the communication device 200 identifies cells 3 and 4 as qualified cells based on signal quality and SFN information as described with respect to FIGS. 3A and 3G. At this time, a network handoff can be performed from cell 1 (or cell 2) to one of cells 3 and 4.

During the DRX/DTX mode, the communication device 200 can further conserve power by limiting the added on-period to obtain the snapshot information and decode the obtained snapshot information. As described with respect to FIGS. 3A-3G, the communication device 200 can selectively turn on-and-off the RF circuitry 210 and the baseband circuitry 220 to: 1) limit the total number of cells to monitor; 2)

limit the amount of information to process when decoding the SFN; and 3) perform off-line processing of monitored signals from the limited number of cells.

Conserving Mobile Power

The exemplary processes illustrated in FIGS. 3A-3G are described with respect to exemplary process flow diagrams in FIGS. 4A, 4B, 4C and 4D.

Figure 4A:
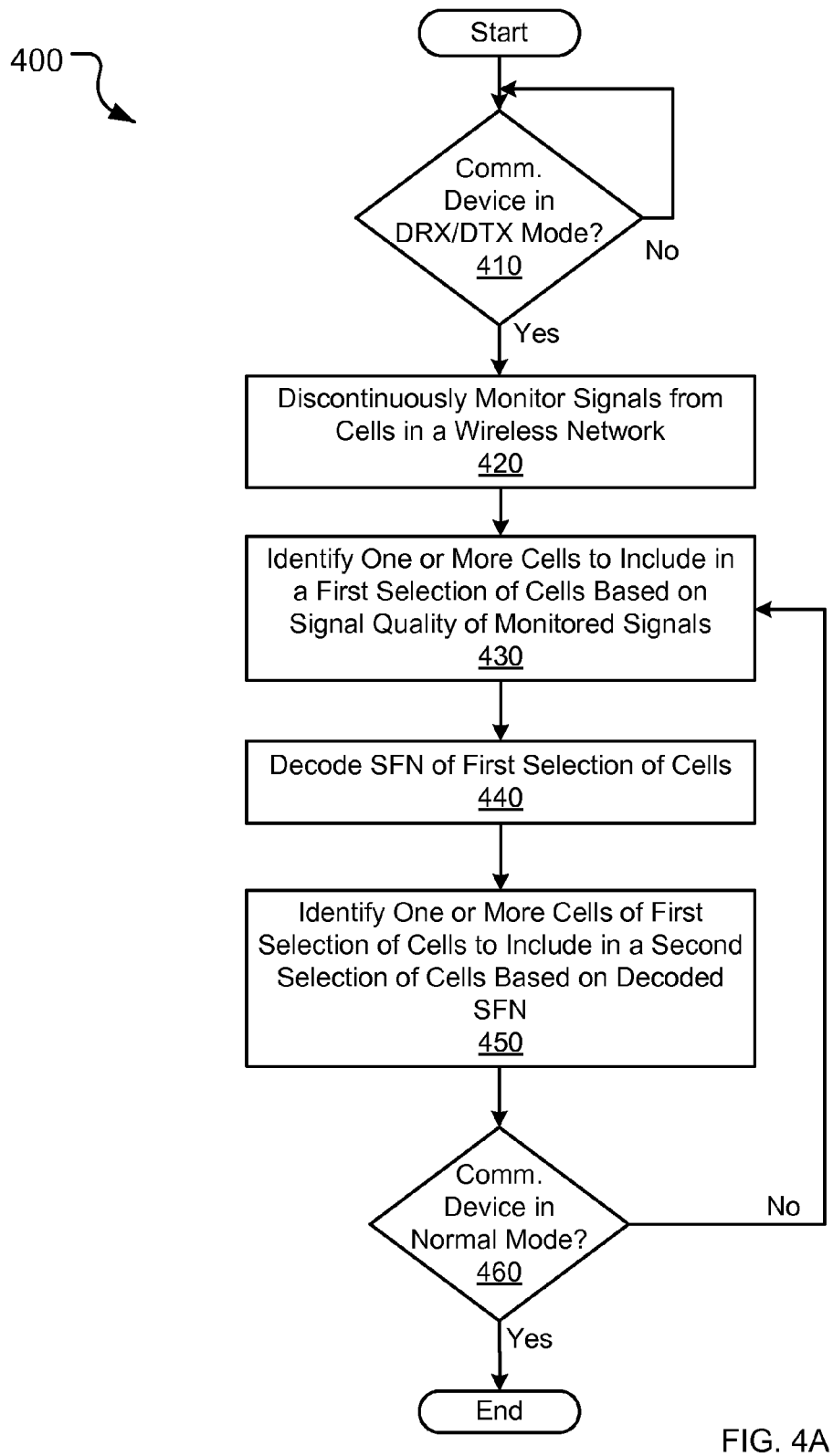
FIG. 4A is a flow diagram showing an exemplary process for reducing power consumption by a communication device during a disconnected mode of operation by selecting a subset of all neighboring cells based on signal quality and decoded SFN.

FIG. 4A is a process flow diagram showing an exemplary process 400 for reducing power consumption by a communication device during a DRX/DTX mode of operation by monitoring a subset of neighboring cells with respect to signal quality and decoded SFN. The process 400 can begin as a communication device (e.g., communication device 200) enters the DRX/DTX mode of operation (410—Yes). As previously described, the communication device can negotiate with a network to operate in the DRX/DTX mode when the communication device is not actively downloading data from the network. While in the DRX/DTX mode, the communication device turns its RF circuitry (e.g., RF circuitry 210) and baseband circuitry (e.g., baseband circuitry 220) on periodically to monitor the neighboring cells in a discontinuous manner (420). The gating pattern for the communication device operating in the DRX/DTX mode can vary based on a particular communication standards supported.

The communication device examines the signal quality of the monitored cells to identify one or more of the neighboring cells to be included in a first selection of cells (430). This first selection based on the signal quality can reduce the total number of cells to decode, which can reduce power consumption. The communication device decodes the SFN information from the first selection of cells (440). Based on the decoded SFN information, the communication device can identify one or more cells in the first selection of cells to be included in a second selection of cells (450). This second selection can be used to further qualify cells as being capable of connecting with the communication device. The process 400 repeats to support the mobile communication device as long as the communication device operates in the DRX/DTX mode (460—No). The second selection of cells can be used to perform handoff of a network connection from a previously connected cell to one of the second selection of cells as the communication device moves away from one coverage area to another coverage area.

Figure 4B:
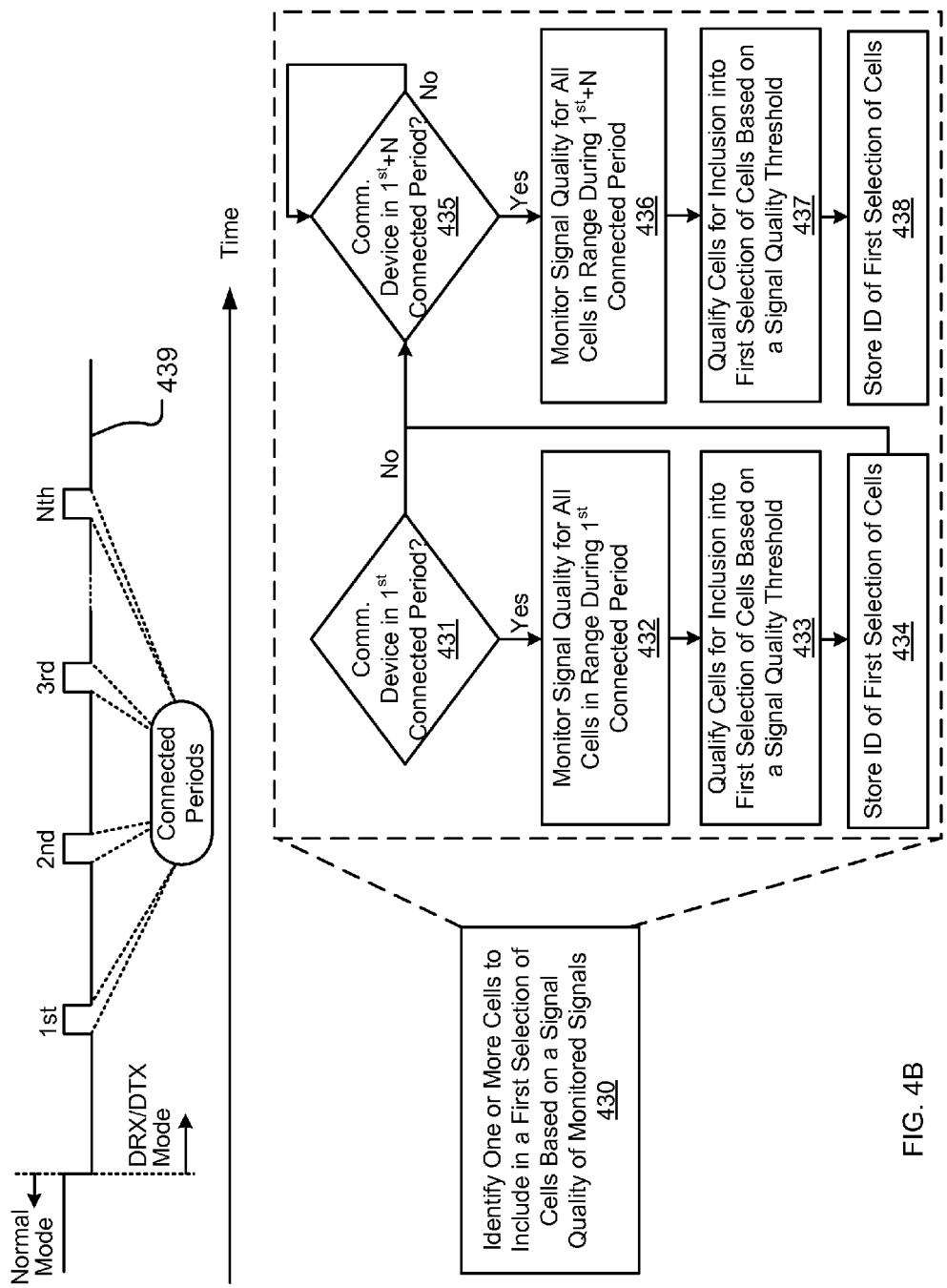
FIG. 4B is a flow diagram showing an exemplary process for qualifying one or more cells to be included in a first selection of cells based on signal quality.

FIG. 4B is a process flow diagram showing an exemplary process 430 for identifying one or more cells to include in a first selection of cells based on signal quality. When the communication device is in its 1st connected (or on) period (e.g., RF-$t_{ON1}$) (431—Yes), the RF circuitry is turned on to monitor the signal quality of all neighboring cells in communication range (432). Based on the monitored signal quality, one or more of the neighboring cells are qualified to be included in a first selection of cells (433). As described with respect to FIGS. 3A-3H, the monitored signal quality (e.g., CPICH SNR, CPICH RSCP, CPICH Eo/Ic) can be compared against a threshold value to qualify the cells in the first selection, e.g., when the monitored signal quality compares in a predetermined manner to the threshold. The 1st on-period can be as short as 2 ms under the 3GPP REL7 HSPA+ standard, for example. The RF circuitry is promptly turned off at the end of the 1st on-period to conserve power. The first selection of cells is stored in a local memory device (e.g., memory device 230) for off-line processing (434). To conserve power, snapshot information of the first selection of cells can be obtained or decode during the next on-period. This can reduce power consumption due to extended on-period or an extra-on period for the RF circuitry.

For other on-periods after the 1st on-period (e.g., 1st+N on-period) (435—Yes), the communication device can repeat the process for identifying cells for the first selection because the communication device might have moved location from the previous on-period. For each 1st+N on-period during the DRX/DTX mode of operation, the communication device monitors the signal quality of the neighboring cells (436). The signal quality monitoring can be performed during the short default on-period (e.g., Def-$t_{ON2}$, Def-$t_{ON3}$, Def-$t_{ON4}$, Def-$t_{ON5}$, ... Def-$t_{ONN}$) rather than the entire RF circuitry on-period (e.g., RF-$t_{ON2}$, RF-$t_{ON3}$, RF-$t_{ON4}$, RF-$t_{ON5}$, ... RF-$t_{ONN}$). One or more of the neighboring cells can be qualified to be included in the first selection of cells based on the signal quality (437). The qualified cells in the first selection can be the same or different from those qualified during the 1st on-period based on the movement of the communication device. The first selection of cells obtained at 437 is stored in a local memory device (438).

At the top of FIG. 4B, an exemplary gating pattern 439 during the DRX/DTX mode is shown to include 1st through Nth on-periods. The process of qualifying cells based on the signal quality is repeated at each on-period to compensate for any change in the location of the mobile communication device. Because the signal quality monitoring process can be performed during the short default on-period (e.g., as short as 2 ms), repeating at each on-period may not significantly add to the power consumption. In some implementations, the process of qualifying the cells based on signal quality can be performed periodically (e.g., every other on-period or every N on-period, where N is an integer) to further reduce power consumption. The stored first selection of cells can be reviewed and confirmed during the next on-period.

Figure 4C:
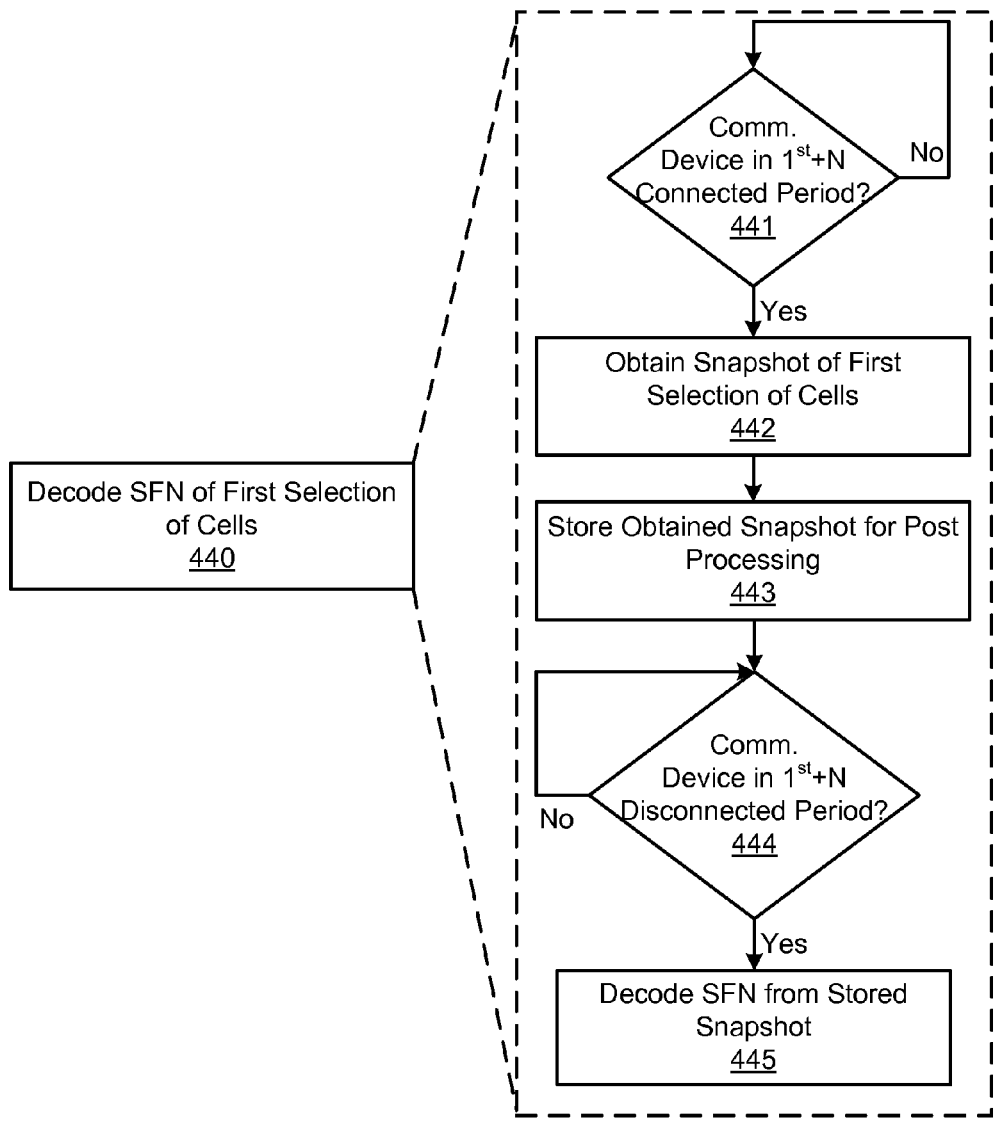
FIG. 4C is a flow diagram showing an exemplary process for decoding SFN for the first selection of cells.

FIG. 4C is a process flow diagram showing an exemplary process 440 of decoding each SFN of the first selection of cells. The first selection of cells can be put through a second selection process based on the SFN information. Starting from the 1st+N on-period (441—Yes), the communication device obtains snapshot information for the qualified cells in the first selection of cells (442). The snapshot information can include the CPICH and broadcast channel information obtained from the first selection of cells. The snapshot information for the qualified cells can change from one on-period to next because the communication device is mobile and may have changed location from one on-period to the next. The obtained snapshot information is stored at a local storage device for off-line processing (443). During the next off-period (or disconnected period) (444—Yes), the stored snapshot information is decoded including the SFN information (445). The snapshot information is processed during the off-period (e.g., RF circuitry is turned off) to conserve power. In some implementations, the communication device can decode only the SFN prime (e.g., 1st 16 bits), which includes the SFN information for each frame in the snapshot information to reduce processing time.

Figure 4D:
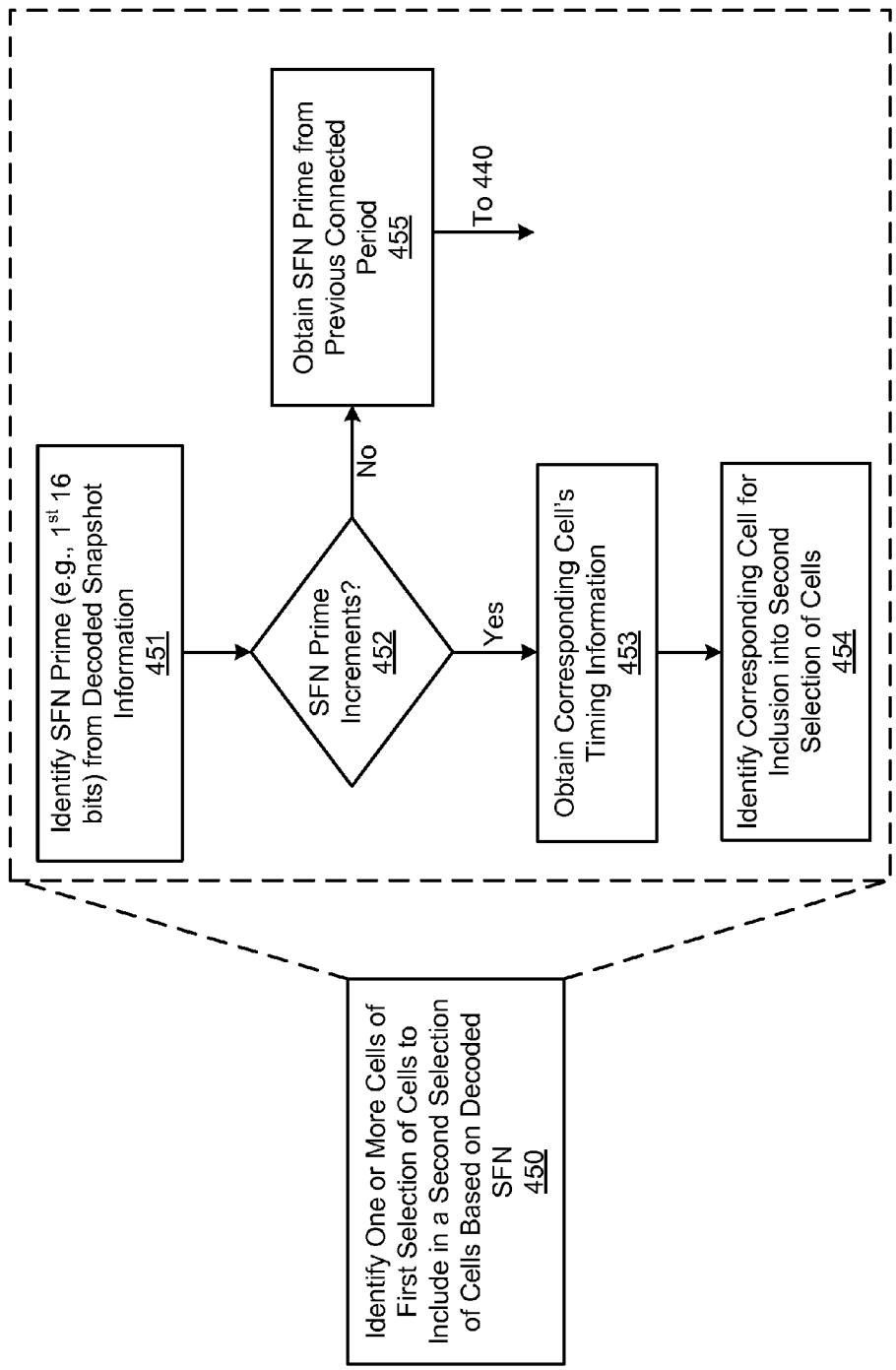
FIG. 4D is a flow diagram showing an exemplary process for identifying one or more cells from the first selection of cells to include in a second selection of cells based on the decoded SFN.

FIG. 4D is a process flow diagram showing an exemplary process 450 of identifying one or more cells from the first selection of cells to include in a second selection of cells based on the decoded SFN. To use the decoded SFN information, the communication device can identify the SFN prime (e.g., 1st 16 bits) of each frame that includes the SFN information (451). If the SFN information is incremented over two consecutive frames (452—Yes), the corresponding cell's timing information can be obtained (453). The communication device identifies those cells with an incrementing SFN for inclusion into a second selection of cells (454). The communication device can rely on the incrementing SFN information to qualify a given cell independent of CRC.

Accordingly, cells are qualified based on the SFN information regardless of the result of CRC error detection. The communication device can connect to any one of the qualified cells in the second selection to perform network handoff as the mobile communication device moves from one area into another area supported by the second selection of cells. If a given cell's SFN information fails to increment, the communication device can retrieve the stored SFN information obtained from the previous on-period.

Applications

The subject matter described in this document can be implemented in various embodiments to provide one or more of the following advantages. For example, the described techniques can be implemented to qualify neighboring cells for inclusion in a group based on the received signal quality corresponding to those neighboring cells. The group can be used to reduce the total number of neighboring cells that are monitored during the on-periods of the DRX/DTX mode implemented by a communications device. By reducing the total number of cells to monitor, a communication device can further reduce the duration of the periods for which its RF circuitry is turned on. Because operating the RF circuitry can consume significant amounts of battery power, limiting the duration for which the RF circuitry is turned on can reduce total power consumption by the communication device. In addition, the described techniques can be used to perform SFN decoding with respect to qualified cells off-line, when the RF circuitry is turned off, to further reduce power consumption. Further, to promote accuracy of the cell selection process, cells can be qualified based on the signal quality and the SFN information.

A few embodiments have been described in detail above, and various modifications are possible. The disclosed subject matter, including the functional operations described in this document, can be implemented in electronic circuitry, computer hardware, firmware, software, or in combinations of them, such as the structural means disclosed in this document and structural equivalents thereof, including potentially a program operable to cause one or more data processing apparatus to perform the operations described (such as a program encoded in a computer-readable medium, which is a non-transitory medium which retains information recorded therein. Examples of such media include, e.g., a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this document contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this document.

What is claimed is:

1. A wireless communication device comprising:
radio frequency circuitry configured to be powered on and off to discontinuously receive radio frequency signals broadcast by one or more base stations in a wireless network; and
baseband circuitry connected to the radio frequency circuitry configured to process the received radio frequency signals to identify a first subset of the one or more base stations for which to perform system frame number (SFN) decoding, wherein the first subset is identified based on a signal quality associated with the received radio frequency signals;
wherein the baseband circuitry is further configured to decode a SFN of each base station in the first subset of base station to identify a second subset of base stations.

2. The wireless communication device of claim 1, wherein:
the baseband circuitry is further configured to perform the decoding during a decoding period, during at least part of which the radio frequency circuitry is turned off.

3. The wireless communication device of claim 1, wherein:
a base station of the one or more base stations is identified for inclusion in the first subset when an associated signal quality compares in a predetermined manner to a signal quality threshold.

4. The wireless communication device of claim 1, wherein the radio frequency circuitry is configured to:
turn on when the baseband circuitry is determining the first subset of the one or more base stations; and
turn off for at least part of the period for which the baseband circuitry is decoding the SFN of the each base station included in the first subset.

5. The wireless communication device of claim 1, wherein:
the baseband circuitry is configured to determine the signal quality of the received radio frequency signals by determining a value of a common pilot channel signal to noise ratio (CPICH SNR) corresponding to the received radio frequency signals and comparing the determined CPICH SNR value with a threshold CPICH SNR value.

6. A wireless communication device comprising:
radio frequency circuitry configured to be powered on and off to discontinuously receive radio frequency signals broadcast by one or more base stations in a wireless network; and
baseband circuitry connected to the radio frequency circuitry configured to process the received radio frequency signals to identify a subset of the one or more base stations for which to perform system frame number (SFN) decoding, wherein the subset is identified based on a signal quality associated with the received radio frequency signals;
wherein the baseband circuitry is further configured to:
perform a first identification of the one or more base stations to include in the subset based on a signal quality of the received radio frequency signals determined during a first period of time when the radio frequency circuitry is turned on; and
perform a second identification of the one or more base stations to include in the subset based on a signal quality of the received radio frequency signals determined during a second period of time when the radio frequency circuitry is turned on.

7. A method for wireless communication, comprising:
operating a mobile wireless communication device to power on and off radio frequency circuitry within the mobile wireless communication device to discontinuously receive radio frequency signals broadcast by one or more base stations in a wireless network;
operating baseband circuitry within the mobile wireless communication device to identify one or more of the base stations to include in a first selection of base stations based on a signal quality of the received radio frequency signals; and
operating the baseband circuitry to identify one or more base stations in the first selection of base stations to include in a second selection of base stations by decoding a system frame number (SFN) of the first selection of base stations.

8. The method of claim 7, wherein:
identifying the one or more base stations to include in the first selection of base stations is performed when the radio frequency circuitry is powered on; and
decoding the SFN of the first selection of base stations is performed when the radio frequency circuitry is powered off.

9. The method of claim 7, wherein determining the signal quality of the received radio frequency signals comprises:
determining a value of common pilot channel received signal code power (CPICH RSCP) corresponding to the received radio frequency signals; and
comparing the determined CPICH RSCP value with a threshold CPICH RSCP value.

10. The method of claim 7, wherein the signal quality of the received radio frequency signals is determined by:
determining a value of common pilot channel signal to noise ratio (CPICH SNR) corresponding to the received radio frequency signals; and
comparing the determined CPICH SNR value with a threshold CPICH SNR value.

11. The method of claim 7, wherein the signal quality of the received radio frequency signals is determined by:
determining a value of common pilot channel ratio of received energy to total received power spectral density (CPICH Ec/Io) corresponding to the received radio frequency signals; and
comparing the determined CPICH Ec/Io value with a threshold CPICH Ec/Io value.

12. The method of claim 7, wherein decoding the SFN of the first selection of base stations comprises:
determining whether the decoded SFN increments across two consecutive frames.

13. The method of claim 7, wherein identifying the one or more base stations in the first selection of base stations to include in the second selection of base stations is performed independent of a result of cyclic redundancy check (CRC).

14. The method of claim 7, further comprising:
performing a first identification of the one or more of the base stations to include in the first selection of base stations based on a signal quality of the received radio frequency signals determined during a first period of time when the radio frequency circuitry is powered on; and
performing a second identification of the one or more of the base stations to include in the first selection of base stations based on a signal quality of the received radio frequency signals determined during a second period of time when the radio frequency circuitry is powered on.

15. A non-transitory computer readable medium embodied with a computer program product configured to cause a mobile wireless communication device to perform operations comprising:
powering on and off radio frequency circuitry within the mobile wireless communication device to discontinuously receive radio frequency signals from base stations in a wireless network;
operating baseband circuitry within the mobile wireless communication device to process the discontinuously received radio frequency signals to select one or more of the base stations to include in an active set of base stations for use as a potential hand-off target base station, wherein the one or more of the base stations is selected for the active set of base stations based on a signal quality of the received radio frequency signals;
operating the baseband circuitry to verify the active set of base stations and
operating the baseband circuitry to decode a system frame number (SFN) of each base stations in the verified active set of base stations to identify a second set of base stations for use as the potential hand-off target base station.

16. The non-transitory computer readable medium of claim 15, wherein the computer program product is configured to cause the communication device to perform operations comprising:
identifying the one or more base stations to include in the active set of base stations when the radio frequency circuitry is powered on; and
decoding the SFN of the verified active set of base stations when the radio frequency circuitry is powered off.

17. The non-transitory computer readable medium of claim 15, wherein the computer program product is configured to cause the communication device to determine the signal quality of the received radio frequency signals comprising:
determining a value of common pilot channel signal to noise ratio (CPICH SNR) corresponding to the received radio frequency signals; and comparing the determined CPICH SNR value with a threshold CPICH SNR value.

18. The non-transitory computer readable medium of claim 15, wherein the computer program product is configured to cause the communication device to determine the signal quality of the received radio frequency signals comprising:
    determining a value of common pilot channel ratio of received energy to total received power spectral density (CPICH Ec/Io) corresponding to the received radio frequency signals; and
    comparing the determined CPICH Ec/Io value with a threshold CPICH Ec/Io value.

19. The non-transitory computer readable medium of claim 15, wherein the computer program product is configured to cause the communication device to decode the SFN of the active set of base stations comprising:
    determining whether the decoded SFN increments across two consecutive frames.

20. The non-transitory computer readable medium of claim 15, wherein the computer program product is configured to cause the communication device to identify the one or more base stations in the active set of base stations to include in the second selection of base stations independent of a result of cyclic redundancy check (CRC).

* * * * *